United States Patent [19]
Izumitani et al.

[11] 3,798,041
[45] Mar. 19, 1974

[54] OPTICAL GLASS HAVING ANOMALOUS DISPERSION PROPERTIES

[75] Inventors: Tetsuro Izumitani; Isao Masuda, both of Tokyo, Japan

[73] Assignee: Hoya Glass Works, Ltd., Tokyo, Japan

[22] Filed: July 24, 1972

[21] Appl. No.: 274,384

[30] Foreign Application Priority Data
July 23, 1971 Japan.................................. 46-55113

[52] U.S. Cl. ............................................. 106/47 Q
[51] Int. Cl. ............................................. C03c 3/16
[58] Field of Search ...................... 106/47 Q, 47 R

[56] References Cited
UNITED STATES PATENTS
3,490,928   1/1970   Brewster et al.................. 106/47 Q FOREIGN PATENTS OR APPLICATIONS
1,339,339   8/1963   France............................ 106/47 Q
1,089,935   9/1960   Germany........................ 106/47 Q

*Primary Examiner*—Helen M. McCarthy
*Attorney, Agent, or Firm*—Sughrue, Rothwell, Mion, Zinn and Macpeak

[57] ABSTRACT

An optical glass having an anomalous dispersion property in the short wavelength region, a high Abbe number of greater than 52, a high stability of devitrification and an excellent acid resistance and consisting of.

$P_2O_5$ 44.0 to 68.0%, $B_2O_3$ 5.0 to 21.0%, $Al_2O_3$ 1.0 to 8.0%, BaO 4.0 to 33.0%, MgO 1.0 to 14.5%, ZnO 0 to 10.5%, SrO 0 to 12.0%, CaO 0 to 7.0%, $La_2O_3$ 0 to 9.0%, $ThO_2$ 0 to 7.0%, $TiO_2$ 0.5 to 4.2% and $As_2O_3$ 0 to 3.5%, by weight is disclosed.

2 Claims, 1 Drawing Figure

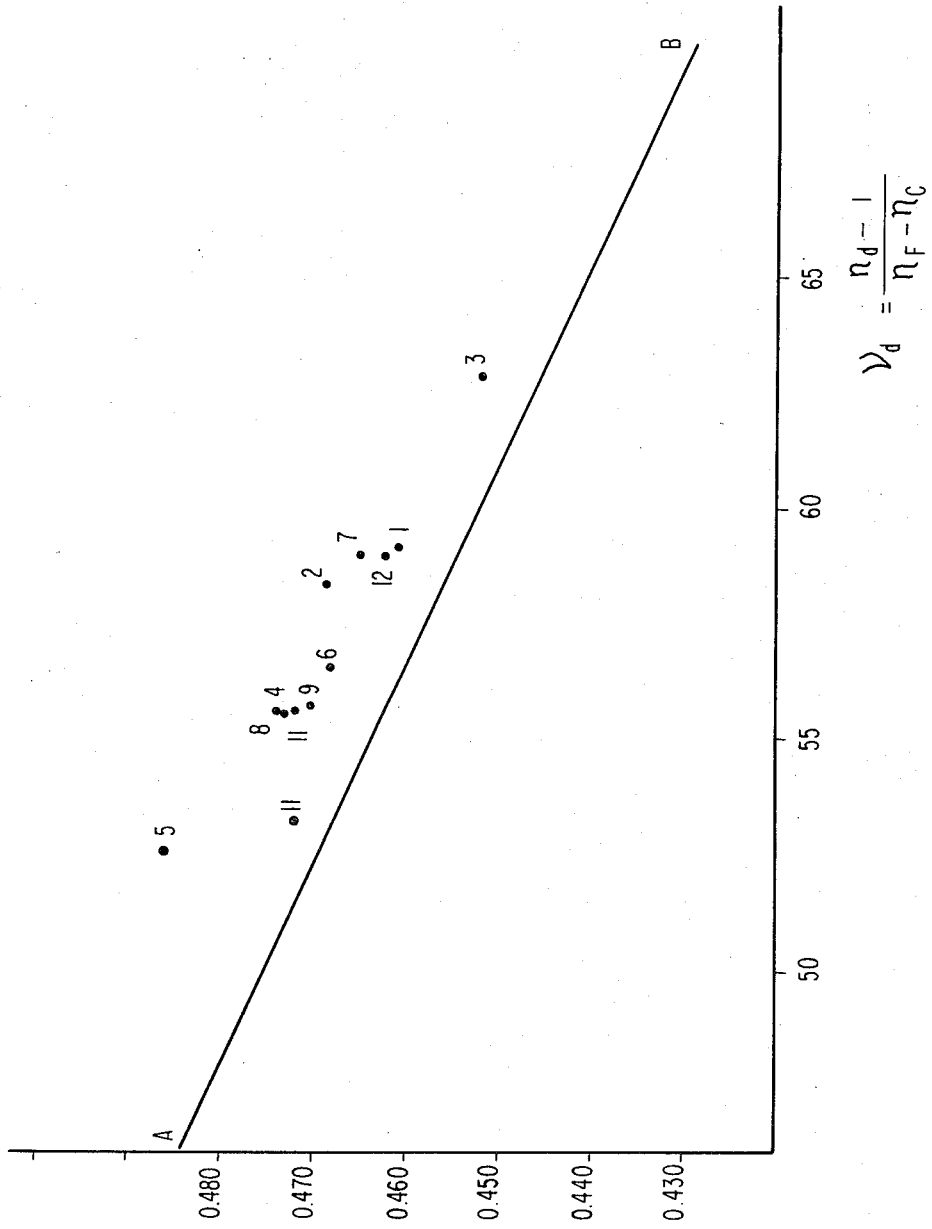

OPTICAL GLASS HAVING ANOMALOUS DISPERSION PROPERTIES

BACKGROUND OF THE INVENTION:

1. Field of the Invention

This invention relates to an optical glass having the abnormality of a dispersion property in the short wavelength region, a high Abbe number of greater than 52, a high stability to devitrification and a favorable acid resistance.

2. Description of the Prior Art

In the production of a super-achromat, super achromatism cannot be obtained by assembling normal dispersion glasses wherein the relation between the Abbe number ($\nu_d$) and the partial dispersion ratio ($P_{hg}$) on the $g$-$h$ line is linear but are obtained by assembling anomalous dispersion glasses having a relation between the Abbe number and the partial dispersion ratio which is different from that of the normal dispersion glass. Especially, an optical glass having an anomalous dispersion property in the range near the ultraviolet region is required to obtain super-achromatism, since the sensitivity spectrum of the photosensitive material and that of the photoelectric tube are high at the short wavelength side. The partial dispersion ratio is indicated by $n_h - n_g / n_F - n_c$.

The inventors have already applied for a patent on a $TiO_2$ containing anomalous glass belonging to the above glass type, as a Japanese Patent Application No. 17757/70. This glass, however, has poor stability to devitrification where the $TiO_2$ content is high, and accordingly, it is not particularly suitable for practical use.

SUMMARY OF THE INVENTION

Therefore, an object of this invention is to overcome the above defect and to provide an improved glass composition having a high stability to the devitrification. According to this invention, $B_2O_3$ is added to a $TiO_2$ containing phosphate glass to improve the stability to devitrification, and further $La_2O_3$ and $ThO_2$ are added to a base glass composition to compensate for the chemical durability, especially, the acid resistance, which would otherwise be reduced.

The optical glass of this invention consists of $P_2O_5$ 44.0 to 68.0%, $B_2O_3$ 5.0 to 21%, $Al_2O_3$ 1.0 to 8.0%, BaO 4.0 to 33.0%, MgO 1.0 to 14.5%, ZnO 0 to 10.5%, SrO 0 to 12.0%, CaO 0 to 7.0%, $La_2O_3$ 0 to 9.0%, $ThO_2$ 0 to 7.0%, $TiO_2$ 0.5 to 4.2%, and $As_2O_3$ 0 to 3.5%, by weight.

BRIEF DESCRIPTION OF THE ACCOMPANYING DRAWING

The accompanying drawing shows the relationship between the $\nu_d$ and the $P_{hg}$ for a normal dispersion glass and the relationship for the glasses of this invention.

DETAILED DESCRIPTION OF THE INVENTION

The $P_2O_5$, which is the main component of a phosphate glass, exhibits a basic absorption in the short wavelength region apart from the visual light zone, so that the dispersion curve of refractive index plotted against wavelength for the phosphate glass is gentle and the Abbe number of the phosphate glass is high. Where the $P_2O_5$ content exceeds 68.0 percent by weight, the stability to devitrification is steeply reduced, whereas where the $P_2O_5$ content is lower than 44 percent, the Abbe number is too low and the acid resistance is decreased.

$TiO_2$, having a strong absorption property in the region near the ultraviolet region, imparts to the glass the anomaly of dispersion in the short wavelength region. The greater the amount of $P_2O_5$ is, the greater the effect of $TiO_2$ is increased, but an excess amount of $TiO_2$ reduces the Abbe number of the resulting glass and lowers the stability to devitrification of the glass. The preferable range of the $TiO_2$ content ranges between 0.5 to 4.2 percent.

$Al_2O_3$ and $B_2O_3$, especially the latter, are effective to compensate for the reduction of the stability to devitrification arising as a result of the addition of $TiO_2$. The preferable range of $B_2O_3$ and that of $Al_2O_3$ are 5.0 to 21.0 percent and 1.0 to 8.0 percent, respectively.

Oxides of alkaline earth metals and rare earth metals, such as BaO, MgO, CaO, SrO, ZnO, $La_2O_3$ and $ThO_2$, are favorable glass modifiers for the phosphate base glass of this invention. The BaO improves remarkably the stability of the glass to devitrification, and the preferable range is 4.0 to 33.0 percent. 1.0 to 14.5 percent of MgO prevents the coloring of the glass blue due to $Ti^{3+}$ ion and also improves the stability to devitrification. 0 to 10.5 percent of ZnO brings out the same effect as that of MgO. SrO increases the stability to devitrification for the glass having a relatively low phosphate content, and the preferable range is 0 to 12.0 percent. 0 to 7.0 percent of CaO improves the chemical durability of the glass. $La_2O_3$ and $ThO_2$, a part of which can replace BaO, improve remarkably the acid resistance without reducing the Abbe numer and the anomalous dispersion property. The effect of $La_2O_3$ and that of $ThO_2$ are to restore the acid resistance, which is reduced by the addition of a large amount of BaO, to a level suitable for practical use. For example, if 6 percent of BaO is substituted by $La_2O_3$, the weight loss (wt.%) of the glass due to the acidic attack can be reduced to half. $ThO_2$ exhibits a similar effect as that of $La_2O_3$ but not as strongly. The preferable range of the $La_2O_3$ content and that of the $ThO_2$ content are 0 to 9.0 percent and 0 to 7.0 percent, respectively. If the $La_2O_3$ content and $ThO_2$ exceed the above restricted ranges, both the anomalous dispersion property and the stability to devitrification are reduced. $As_2O_3$ also suppresses the detrimental blue coloring due to the $Ti^{3+}$ ion, which is caused by adding excess amounts of $TiO_2$ to the phosphate glass, and the preferable amount is 0 to 3.5 percent.

Preferred ranges of the amounts for the components of the glass of this invention are $P_2O_5$ 46.0 to 60.0%, $B_2O_3$ 5.0 to 15.0%, $Al_2O_3$ 2.0 to 5.0%, BaO 7.0 to 25.0%, MgO 5.0 to 12.0%, ZnO 0 to 10.0%, SrO 0 to 6.0%, CaO 0 to 6.0%, $La_2O_3 + ThO_2$ 2.0 to 7.0%, $TiO_2$ 1.0 to 3.0%, $As_2O_3$ 0 to 2.0%, by weight.

Now, some examples of this invention will be explained with reference to following tables and the accompanying drawing showing the relationship between the Abbe number ($\nu_d$) and the partial dispersing ratio ($P_{hg}$) on the $g$-$h$ line for the anomalous dispersion optical glass of this invention and that for a conventional normal dispersion glass.

Table 1 shows the compositions for various glass specimens of this invention.

TABLE 1

(Wt. percent)

| Specimen number | P$_2$O$_5$ | B$_2$O$_3$ | Al$_2$O$_3$ | BaO | ZnO | SrO | MgO | CaO | La$_2$O$_3$ | ThO$_2$ | TiO$_2$ | As$_2$O$_3$ |
|---|---|---|---|---|---|---|---|---|---|---|---|---|
| 1 | 46.60 | 19.60 | 2.45 | 13.73 | 3.92 | — | 5.88 | 5.88 | — | — | 1.94 | — |
| 2 | 53.58 | 12.34 | 2.47 | 13.82 | 3.95 | — | 5.92 | 5.92 | — | — | 2.00 | — |
| 3 | 54.30 | 12.34 | 2.47 | 13.82 | 3.95 | — | 5.93 | 5.91 | — | — | 1.28 | — |
| 4 | 53.30 | 12.13 | 2.43 | 13.58 | 3.88 | — | 5.82 | 5.82 | — | — | 3.04 | — |
| 5 | 51.50 | 11.70 | 2.35 | 13.12 | 3.75 | — | 5.62 | 5.62 | — | — | 3.84 | 2.50 |
| 6 | 66.20 | 7.74 | 6.40 | 4.50 | — | — | 13.16 | — | — | — | 2.00 | — |
| 7 | 61.20 | 14.70 | 4.90 | 4.50 | — | — | 13.16 | — | — | — | 1.54 | — |
| 8 | 59.50 | 14.30 | 4.77 | 4.38 | — | — | 12.77 | — | — | — | 2.98 | 1.50 |
| 9 | 53.30 | 10.13 | 2.43 | 7.58 | 3.88 | — | 5.82 | 5.82 | 8.04 | — | 3.04 | — |
| 10 | 53.30 | 12.13 | 2.43 | 7.58 | 3.88 | — | 5.82 | 5.82 | — | 6.00 | 3.04 | — |
| 11 | 45.00 | 5.50 | 3.50 | 32.20 | 9.80 | — | 2.00 | — | — | — | 2.00 | — |
| 12 | 46.00 | 5.50 | 3.50 | 30.00 | — | 11.00 | 2.00 | — | 1.00 | — | 1.00 | — |

Table 2 shows the various physical properties of the glass compositions listed in Table 1.

TABLE 2

| Specimen No. | $n_d$ | $\nu_d$ | $P_{hg}$ | Lt(°C) | Acid Resistance |
|---|---|---|---|---|---|
| 1 | 1.57694 | 59.15 | 0.4605 | 1000 | 5th class |
| 2 | 1.57564 | 58.37 | 0.4683 | 905 | 4th " |
| 3 | 1.56623 | 62.87 | 0.4519 | 865 | 4th " |
| 4 | 1.58093 | 55.54 | 0.4728 | 990 | 4th " |
| 5 | 1.58809 | 52.58 | 0.4853 | 1020 | 4th " |
| 6 | 1.54415 | 56.51 | 0.4676 | 1013 | 3rd " |
| 7 | 1.53715 | 58.97 | 0.4645 | 1000 | 3rd " |
| 8 | 1.53731 | 55.55 | 0.4732 | 1020 | 3rd " |
| 9 | 1.58584 | 55.62 | 0.4703 | 1010 | 3rd " |
| 10 | 1.58521 | 55.58 | 0.4715 | 1005 | 3rd " |
| 11 | 1.59885 | 53.20 | 0.4718 | 1000 | 4th " |
| 12 | 1.59310 | 58.97 | 0.4620 | 845 | 4th " |

The liquidus temp. (Lt) was determined by measuring the highest temperature at which devitrification was caused in the glass; i.e., 1.0 to 2.0 mm diameter granules of the glass to be tested were placed on a Pt plate, which was charged in a furnace having a temperature gradient therein from 700°C to 1,200°C; after being in the furnace for about 40 min., the glass granules were inspected using a microscope to observe at which temperature devitrified granules occurred.

The acid resistance was determined using "the method of measuring the chemical durability of the optical glass (powder method)" in the Japanese Optical Glass Industrial Standard. This acid resistance is classified into five grades as follows;

| Grade | Weight Loss due to Acidic Attack (%) |
|---|---|
| 1st Class | 0.21 – 0.35 |
| 2nd Class | 0.36 – 0.65 |
| 3rd Class | 0.66 – 1.20 |
| 4th Class | 1.21 – 2.20 |
| 5th Class | $\geq 2.21$ |

In the FIGURE, the straight line (A-B) shows the relationship between the $\nu_d$ and the $P_{hg}$ for the normal dispersion glass, whereas the dots show the relationship for the anomalous dispersion glass specimens according to this invention. The number on each dot corresponds to the specimen number in Table 1 and 2. All of the dots 1 to 12 lie in the zone to the right of the straight line (A-B), and this means that the glass specimens of this invention have the anomalous dispersion properties.

The glass specimens listed in the Tables were produced by mixing orthophosphoric acid, metaphosphates of alkaline earth metals, carbonates, and hydroxides together, fusing the resulting mixture at 1,280° to 1,350°C for 30 min to 2hr, agitating and refining the mixture, casting the clarified mixture into a mold and cooling the obtained glass slowly.

It is apparent from the above examples that an optical glass having an Abbe number of greater than 52 and a high anomalous dispersion property in the short wavelength region, a sufficient stability to devitrification and an excellent chemical durability can be obtained according to this invention.

While this invention has been described with reference to particular embodiments thereof, it will be understood that numerous modifications may be made by those skilled in the art without actually departing from the scope of this invention.

Therefore, the appended claims are intended to cover all such equivalent variations as comming within the true spirit and scope of this invention.

What is claimed is:

1. An optical glass having an Abbe number greater than 52 and a high anomalous dispersion property in the short wavelength region, stable to devitrification and having excellent acid resistance, consisting of by weight, P$_2$O$_5$ 44.0 to 68.0%, B$_2$O$_3$ 5.0 to 21.0%, Al$_2$O$_3$ 1.0 to 8.0%, BaO 4.0 to 33.0%, MgO 1.0 to 14.5%, ZnO 0 to 10.5%, SrO 0 to 12.0%, CaO 0 to 7.0%, La$_2$O$_3$ 0 to 9.0%, ThO$_2$ 0 to 7.0%, TiO$_2$ 0.5 to 4.2%, and As$_2$O$_3$ 0 to 3.5%.

2. The anomalous dispersion optical glass of claim 1, wherein said glass consists of, by weight, P$_2$O$_5$ 46.0 to 60.0%, B$_2$O$_3$ 5.0 to 15.0%, Al$_2$O$_3$ 2.0 to 5.0%, BaO 7.0 to 25.0%, MgO 5.0 to 12.0%, ZnO 0 to 10.0%, SrO 0 to 6.0%, CaO 0 to 6.0%, La$_2$O$_3$ + ThO$_2$ 2.0 to 7.0%, TiO$_2$ 1.0 to 3.0% and As$_2$O$_3$ 0 to 2.0%.

* * * * *